Figure 1:
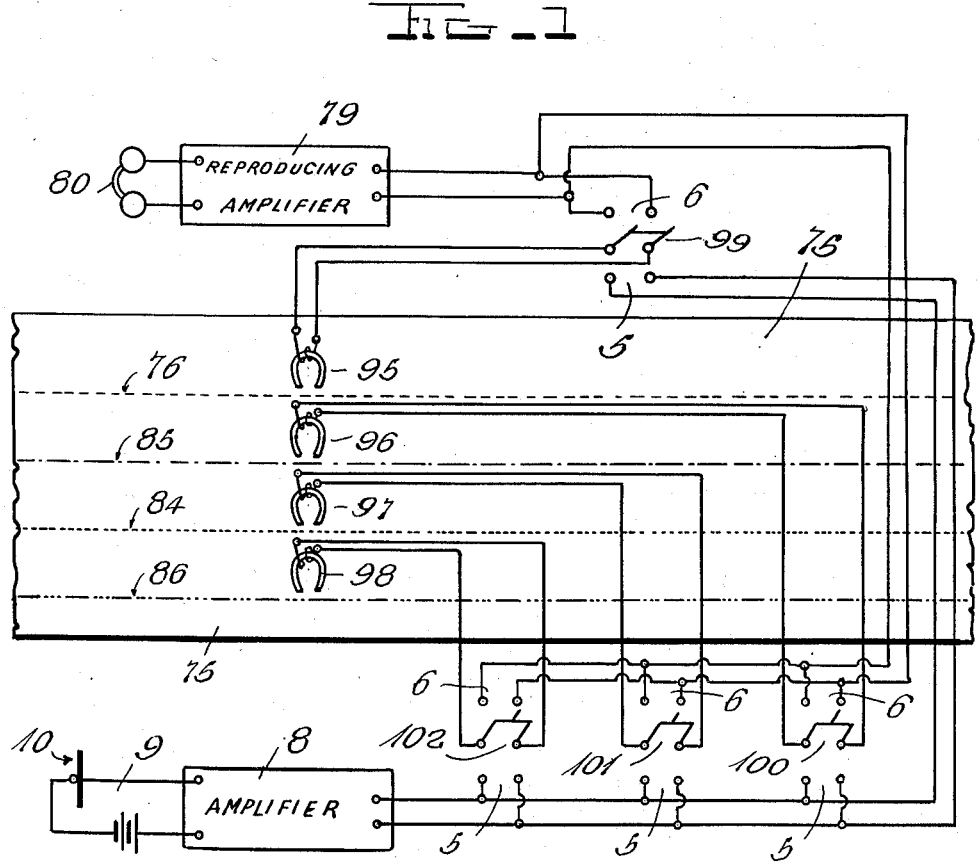

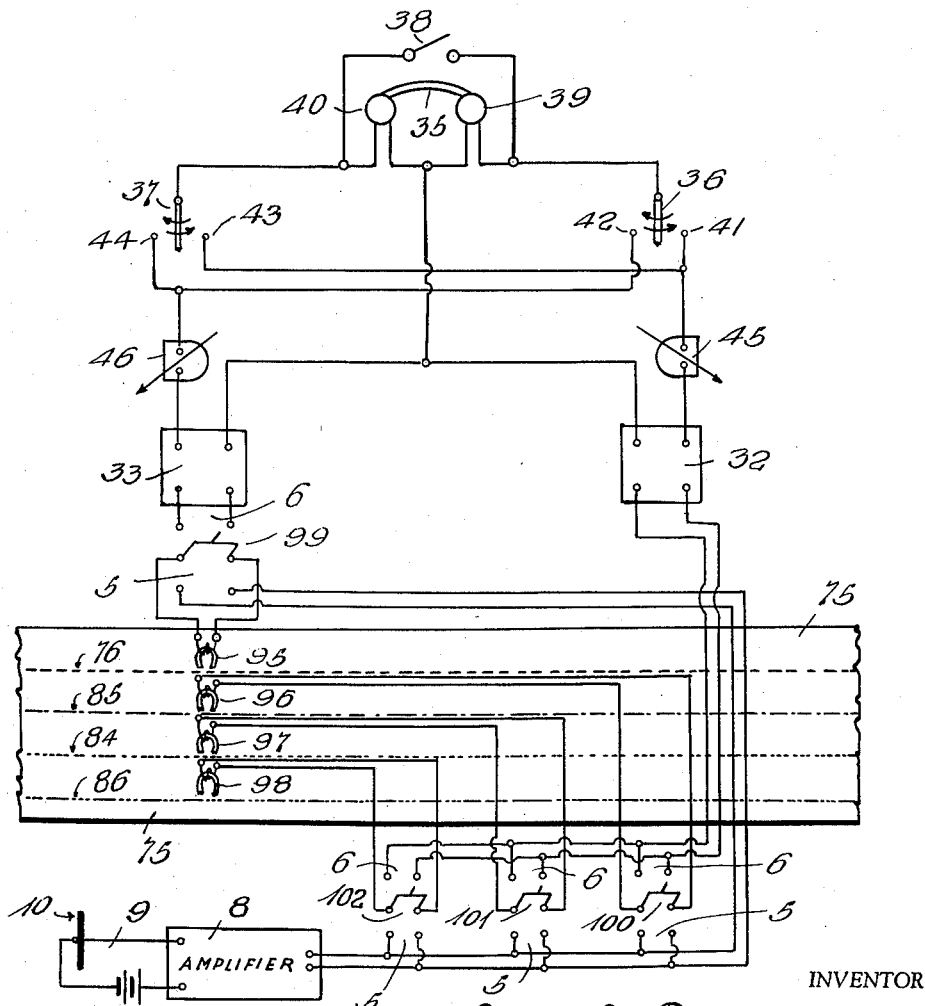

Nov. 3, 1959     L. E. DOSTERT     2,911,482
METHOD AND APPARATUS FOR TEACHING LANGUAGES
Original Filed Nov. 7, 1951     2 Sheets-Sheet 2

INVENTOR
Leon E. Dostert,
BY Harvey & Harvey
ATTORNEYS

United States Patent Office 2,911,482
Patented Nov. 3, 1959

2,911,482

METHOD AND APPARATUS FOR TEACHING LANGUAGES

Leon E. Dostert, Washington, D.C.

Original application November 7, 1951, Serial No. 255,211, now Patent No. 2,777,901, dated January 15, 1957. Divided and this application November 28, 1956, Serial No. 624,909

8 Claims. (Cl. 179—100.2)

My invention relates broadly to a method and apparatus for use in teaching foreign languages, and more particularly to a method and apparatus for the teaching of an unknown language in relation to a known language by providing auditions of the same expression in both languages.

This application is a division of my application Serial Number 255,211, filed November 7, 1951 for Method and Apparatus for Teaching Languages, now Patent 2,777,901, dated January 15, 1957.

The principal object of my invention is to provide a method wherein known and unknown language recordings may be selectively reproduced in relation to one another so that intelligence is conveyed from either or both recordings for the instruction of students.

Another object of my invention is to provide a method of preparing recordings of known and unknown languages in such timed relation with respect to each other that two languages may be reproduced in comparative relations for audible analysis and study by language students endeavoring to learn the unknown language.

Still another object of my invention is to provide a method of teaching unknown languages by comparison with a known language wherein recordings of the known language and a translation thereof into an unknown language may be selectively recorded and reproduced in multiple sound tracks in any one of several sequential relations, that is, with the recording and reproduction of the translations of the known language into the unknown language presynchronized or simultaneously synchronized or post-synchronized with respect to the recording and reproduction of the known language.

A still further object of my invention is to provide an apparatus for reproducing prepared recordings of a known language and a translation thereof into an unknown language as will enable students to readily compare the characteristics thereof and by such comparison become so familiar with the unknown language as to readily interpret the translation thereof in terms of the known language.

Still another object of my invention is to provide a reproducing system for bilingual audition apparatus by which reproductions of a known language and a translation thereof may be selectively reproduced in a reproducing circuit simultaneously, bilaterally or unilaterally relative to each other at the will of the student studying the translation of the known language by audible comparison with a known language.

A further object of my invention is to provide an arrangement of comparative language recordings by which a student may directly compare his own proficiency in any language with respect to a reproduction of the correct use of the language under study for thus increasing personal ability in such language.

Still another object of my invention is to provide a system of language study by comparison methods between the reproduction of a known language and the selective reproduction of translations of the known language into any one of several different unknown languages for broadening the knowledge of a student in the several different languages.

A still further object of my invention is to provide a multiple channel recording and reproducing system for teaching languages in which translations of a known language are recorded in presynchronized, simultaneously synchronized and/or post-synchronized relationship for selective reproduction relative to the known language for enabling students to become familiar with the unknown languages.

Still another object of my invention is to provide a method and apparatus for the magnetic recording and reproduction of indicia employing a tape having a multiplicity of magnetic heads aligned in spaced positions transversely of the tape for the recording and reproduction of indicia with respect to channels extending longitudinally of the tape in combination with permutation and combination switches, a recording circuit and a reproducing circuit which permit the reproduction of indicia on one channel while effecting a synchronized recording on another channel for subsequent playback, simultaneously, unilaterally or bilaterally.

Figure 2:
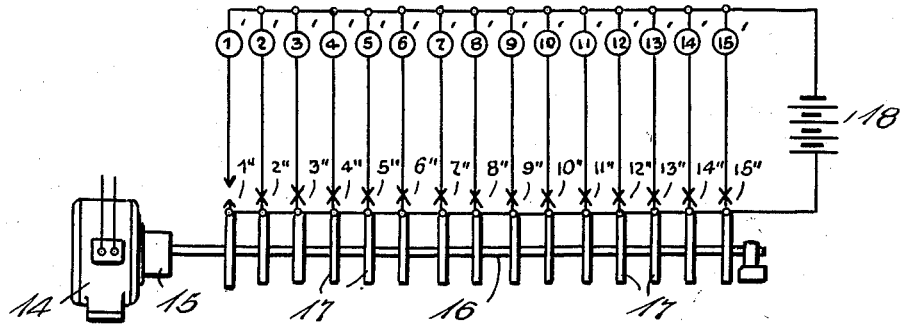

Other and further objects of my invention are to provide a method and apparatus for the training of students in languages, in a manner which has been found to be more rapid and efficient than conventional text book studies, as is set forth in the specification hereinafter following by reference to the accompanying drawings in which:

Fig. 1 illustrates the method of recording a known language and an unknown language according to the method of my invention;

Fig. 2 schematically shows a timing system which I employ as part of the method of my invention for the proper sequential recording of both the known and unknown languages in such relationship that proper comparison of the characteristics of the two languages can be made during the reproduction process;

Fig. 3 is an illustrative chart showing the manner of dividing the texts of both the known and unknown languages into groups which are recorded in the manner illustrated in Fig. 1 according to the operation of the timing system shown in Fig. 2; and Fig. 4 diagrammatically and schematically shows a reproducing system employing the recordings prepared according to the principles shown in Figs. 1–3 and illustrating particularly the selective control system for the bilingual reproduction provided by my invention.

Primarily my invention is concerned with recorded speech which is placed upon conventional recording media such as phonograph records, films, magnetic tapes, or wires and the like. The technique of preparing the records is of great importance in the proper carrying out of my invention. While I have disclosed my invention as relating to a bilingual method and apparatus wherein the English language is considered as the base to which the unknown language, or translation is compared, it is to be understood that the comparison may be revised or any two languages may be audibly compared and that the reference herein to the English language as related to other languages is to be considered in the illustrative sense and not in the limiting sense.

The recordings are initially prepared by an expert in language study according to the method depicted in Figs. 1, 2 and 3. Fig. 1 represents the recording system employing a tape 75 having magnetic heads designated by reference characters 95, 96, 97 and 98, which respectively connect to the center poles of the switch blades of the double-pole double-throw switches 99, 100, 101 and 102. The pairs of switch blades of the double-pole double-throw switches 99, 100, 101 and 102 individually connect with the respective magnetic heads 95–98 and the sets of lower poles 5 individually connect to the output of amplifier 8, the input of which connects to the voice channel circuit 9 controlled from microphone 10. The upper sets of contacts 6 of switches 99–102 connect with the input of amplifier 79 leading to reproducers 80. With switch 99 thrown to down position 5, a recording is placed on magnetic tape 75 and may be the English script 11 represented in Fig. 3 which has been initially divided into phrases or sections designated by markings 12 predetermined as to reading time to be correlated with the visual timing system shown in Fig. 2. The timing system of Fig. 2 is representative of any means by which the signal lamps 1', 2', 3', 4', 5', 6', 7', 8', 9', 10', 11', 12', 13', 14' and 15' are controlled for predetermined intervals of time. In the timing arrangement illustrated, which is the invention of A. C. Holt of International Business Machines Corporation, a driving motor 14 operates through a reduction gear system 15 to drive shaft 16 for operating a system of cams 17 which sequentially open a multiplicity of contacts 1", 2", 3", 4", 5", 6", 7", 8", 9", 10", 11", 12", 13", 14" and 15" for successively extinguishing the signal lamps 1', 2', 3', 4', 5', 6', 7', 8', 9', 10', 11', 12', 13', 14' and 15', by opening the electrical circuits from the power source designated at 18 at a controlled rate, such as an interval of 30 seconds, 60 seconds, or some other selected time interval to which the reading time of the English script 11 in Fig. 3 has been correlated, enabling the prescribed portion of the text to be placed upon the magnetic tape 75 in channel 76 within the parameters determined by the time interval during which the corresponding signal lamp is lighted. In the example illustrated, signal lamp 1' has been extinguished and the reader has completed a reading of that portion of the English script designated by the interval 19 in the English scrip 11 of Fig. 3. If the reading is completed while lamp 1' is lighted the reader pauses before commencing the reading of section 20 of the scrip 11 of Fig. 3 until lamp 1' extinguishes, whereupon the reader starts reading section 20 of script 11 of Fig. 3 and completes this before lamp 2' extinguishes. The same method is pursued to complete the English recording on magnetic tape 75 in groups of phrases or sections within the marks 12 of the English script constituting the known language (K).

Tape 75 is now stopped and rewound and then rerun with switch 99 moved to the position to connect the input of amplifier 79 with the magnetic head 95 associated with magnetic tape 75. The recording in channel 76 may thus be played back and concurrently a recording may be made on one or more of the other channels 84, 85 and/or 86 by moving switches 100, 101 and/or 102 into position 5 and speaking into microphone 10, to record the translation shown at 21 in Fig. 3 of the English script 11 previously read and recorded in channel 76. In the example illustrated herein a French script has been shown at 21 in Fig. 3, but as heretofore explained, it will be understood that any unknown language may be recorded instead. The French script 21 is divided by marks 22 into phrases or sections 23, 24, etc., corresponding to the phrases or sections 19, 20, etc. of the English script 11 and the reader must record all of the French script within the limits of adjacent marks, while a corresponding lamp 1', 2', 3', 4', 5', 6', 7', 8', 9', 10', 11', 12', 13', 14' and/or 15' remains lighted. When the reader completes a division of the script and the corresponding lamp is still lighted, the reader pauses until a particular lamp extinguishes before continuing with the succeeding phrase or section of the script. In this way the French script is recorded sequentially on magnetic tape 75 in one or more of the channels 84, 85 or 86 in time sequence relation to the English script previously recorded in channel 76.

In the arrangements of both Figs. 1 and 4, the magnetic heads are all aligned in fixed positions transversely of the tape 75, as represented at 95, 96, 97 and 98, and these heads are each selectively connectable to either a recording or reproducing system through a double-pole, double-throw switching system, which I have indicated at 99, 100, 101, and 102, respectively. Moving the double-pole, double-throw switches to the up-position, designated as 6, connects the respective heads to the reproducing system diagrammatically illustrated by reproducing amplifier 79 and reproducer 80 in Fig. 1, and by the dual reproducer circuit in Fig. 4. Moving the double-pole, double-throw switches to the down-position, designated 5, places the magnetic heads in a recording circuit constituted by mircophone 10, voice control circuit 9, and amplifier 8. Because of the permutation and combination thus permitted by the switching arrangement, differential recordings may be made as follows:

The "unknown" language or translation may be recorded as represented at 85 in a relationship which leads the "known" language previously recorded in wave trace 76.

The "known" language may be recorded in wave trace 76 while reproducing from the "lead" track 85 of the "unknown" language previously recorded, thus recording the "known" language a predetermined time after the "lead" track recording.

The "lag" track 86 of the "unknown" language may be recorded while reproducing from the "known" language 76, thus recording the "lag" in the "unknown" language a predetermined time after the recording of the "known" language.

The "unknown" language may be recorded at 84 simultaneously with the reproduction from the "known" language 76.

Thus the time interval of lag and lead may be selected and determined wholly by the student in providing the desired time interval to contemplate, analyze, and consider the known language with respect to the translation thereof in any one of the relationships of lead, simultaneous reproduction and/or lagging reproduction.

In Fig. 4 I have shown one form of reproducing system for carrying out the principles of my invention wherein switches 99–102 selectively connect in their upper positions 6 with the inputs of amplifiers 32 or 33. The outputs of amplifiers 32 and 33 connect through the circuits, as shown, to a pair of reproducers or head phones 35. The circuit connections are capable of being modified by means of three switches 36, 37 and 38, whereby the electrical manifestations from each of the said magnetic records 84, 85, 86 and/or 76 can be switched into either or both of the reproducers 39 and 40, which together make up the head phones 35. For example, a signal being reproduced from the magnetic record 84 will be delivered to reproducer 39 when switch 101 is moved to position 6 and when the switch 36 is thrown to the contact 41, and similarly a signal from the magnetic record 76 will be received in the reproducer 39 when the switch 99 is moved to position 6 and switch 36 is thrown to the contact 42. In a similar manner, the reproducer 40 will be connected to the magnetic record 85 when switch 100 is moved to position 6 and switch 37 is thrown to the contact 43, and magnetic record 86 will be connected to the reproducer 40 when the switch 102 is moved to position 6 and switch 37 is thrown to the contact 43. When the switch 38 is closed, the reproducers 39 and 40 are connected in parallel so that when switch 36 is thrown to contact 41, or when switch 37 is thrown to contact 43, both reproducers will receive the same signal from a selected magnetic record 84, 85 or 86 and when the switch 36 is thrown to contacts 42, or switch 37 is thrown to contact 44, a signal from magnetic record 76 will be received by each reproducer 39 and 40. However, if the switch 36 is thrown to contact 41 and the switch 37 is thrown to contact 44, two or more magnetic records 76, 84, 85 and/or 86 will be connected to both reproducers of the head reproducers 35 provided that the switch 38 is closed. For bilateral or binaural operation, to best illustrate the invention shown in Fig. 4, the switch 36 is thrown to contact 41 and the switch 37 is thrown to contact 44 (or the switch 36 can be thrown to contact 42 and the switch 37 can be thrown to contact 43), the switch 38 being retained open.

The fact that connections from the magnetic heads 95, 96, 97 and 98 are brought out to the center poles of independently operated double-throw double-pole switches 99, 100, 101 and 102, insures versatile operation of the system of my invention as the permutation and combination switching permits recording and reproduction with respect to the four channels 76, 84, 85 and 86. It will be observed that the sets of switch contacts in the down position 5 connect to the signal transmission circuit 9—10, while the sets of contacts in the up position 6 connect with the signal reproducing circuit 79—80 (Fig. 1) or 32—33—39—40 (Fig. 4). Permutations and combinations of the positions of the switches 99–102 may be selectively made to permit listening to one or more channels and making a synchronized recording on another or other channel for later playback simultaneously, unilaterally or bilaterally.

As an example of the versatile character of the system and equipment of my invention, let it be assumed that the magnetic record 76 is a recorded, French discourse, and that the recording is being sensed by the magnetic head 95 and that the switching circuits are arranged so that the French discourse is reproduced in a single reproducer of the pair of reproducers 39 and 40. Let it be assumed that a similar discourse in English is recorded in channel 85 and that this channel is sensed by magnetic head 96 connected through switch 100 moved to the up position 6 and connected to amplifier 32 to the reproducer switching circuit so that the English discourse is reproduced in a single reproducer opposite to the reproducer in which the aforesaid French discourse is being reproduced. If it is further assumed that the French recording in channel 76 and the English recording in channel 85 are reproduced simultaneously, it will be seen that the same discourse will be reproduced in French in one reproducer and in English in the other reproducer. The intensities of the signals in the reproducers 39 and 40 are regulated by a pair of volume controls, or rheostats, 45 and 46 connected into the circuits extending from the outputs of amplifiers 32 and 33.

In the teaching of a foreign language, it has been demonstrated, after the student has learned the fundamental sounds or symbols with which to express ideas in that language, that further perfection in acquiring proficiency in understanding the language can be best obtained by associating expressions in the foreign language with expressions conveying the same meaning in the language with which one is most familiar. The subject device is particularly adapted to bring about such results. For example, a magnetic tape may be prepared by recording certain expressions in English, and such tape placed upon magnetic record 85; another record is prepared by recording in French and placed upon magnetic record 76. As the magnetic tape 75 is moved lineally, a student wearing the telephone headset 35 may receive the English discourse over one reproducer and simultaneously the equivalent French discourse over the other reproducer. By association, the pupil will then become familiar with each language in terms of the other, and since it may be assumed that the pupil is proficient in one of the languages, by association he will rapidly be familiarized with the other language, which, let it be assumed, is not as well known to him. In this manner, the student can study and increase his language proficiency without the aid of other devices or other external means. It will be understood that there is no limit as to the variety and extent of the recordings which can be placed upon the respective magnetic records 85 and 76.

Simultaneously with the foregoing procedures, magnetic records 84 and 85 may be used for discourses in other languages corresponding to the discourses in channels 76 and 85, or these channels 84 and 86 may be employed by virtue of the permutation and combination switches 101 and 102, to enable recordings to be made for later playback, simultaneously, unilaterally or bilaterally, in a relationship to the foregoing recordings which are presynchronized, simultaneously synchronized, and/or post-synchronized, with respect to the related magnetic records. In the use of the system of my invention a correct language discourse may be recorded in one channel and in another channel the student may record an imitation of the correctly recorded language discourse being learned by him, while the correct language discourse is being played back. The system is so versatile that any kind of response such as a statement in response to a question may also be recorded, thus permitting the student to have, in effect, a conversation which is recorded for subsequent playback and analysis. That is, the student may conduct a question and answer exercise in which the question is recorded on one channel and the response on another channel for later vertification by the listener. The advanced or retarded position of the records in the different channels on the same tape gives the student the time period necessary to mentally absorb and contemplate the meaning of the languages under study.

Reference is made to the copending application of A. C. Holt for Indicia Tape Controlling Apparatus, Serial Number 255,278, filed November 7, 1951, now Patent 2,764,639, dated September 25, 1956, showing mechanism for carrying out certain of the methods of my invention as set forth herein.

While I have described my invention in certain preferred embodiments, I realize that various modifications of both the method and apparatus described herein will occur to those skilled in the art and I desire that it be understood that the principles herein set forth shall be considered as illustrative of my invention, and not as limiting my invention to any specific embodiment and that no limitations upon my invention are intended other than may be imposed by the scope of the appended claims.

What I claim as new and desire to secure by Letters Patent of the United States is as follows:

1. A bilingual system comprising a tape adapted to receive a multiplicity of channels of magnetic records of language sequences thereon in correlated time intervals, a plurality of magnetic heads disposed transversely of the tape at spaced intervals longitudinally aligned with separate magnetic channels extending lineally of the tape, a recording circuit, a reproducing circuit including a pair of reproducers, and switching means individual to each of said magnetic heads for selectively connecting one or more of said magnetic heads with either said recording circuit or either of the reproducers of said reproducing circuit, whereby language sequences may be recorded in selected channels on said tape and the several magnetic records of language sequences on said tape may be simultaneously or individually reproduced in correlated time intervals for comparing one language sequence with respect to another.

2. A bilingual system as set forth in claim 1 in which said transversely disposed magnetic heads are located adjacent each other in a path extending normal to the longitudinal axis of the tape containing the multiplicity of channels of magnetic records.

3. A bilingual system comprising a magnetic tape carrying a timed sequence of a known language magnetic record extending longitudinally thereof and translations of said language magnetic record constituted by a plurality of longitudinally extending time sequence records spaced from the aforesaid record on the same tape wherein the correlated continuity of one of said translations is disposed in transverse alignment with the corresponding continuity of said known language record, another correlated continuity of said translations being disposed in leading relation to said known language magnetic record on the same tape and another correlated continuity of said translations being disposed in lagging relation to said known language magnetic record on the same tape, electro-magnetic means for reproducing said known language magnetic record, separate electro-magnetic means for reproducing any one of the correlated translations of the known language records, electromagnetic pick-up means individual to each of said time sequence records, switching means individual to each of said electromagnetic pick-up means and separate circuits leading from said switching means to said electromagnetic means for selectively completing circuit continuities between one or more of said electromagnetic pick-up means and said electromagnetic means.

4. A bilingual system comprising a magnetic tape carrying a timed sequence of a known language magnetic record extending longitudinally thereof and translations of said language magnetic record constituted by a plurality of longitudinally extending time sequence records spaced from the aforesaid record on the same tape wherein the correlated continuity of one of said translations is disposed in transverse alignment with the corresponding continuity of said known language record, another correlated continuity of said translations being disposed on the same tape in leading relation to said known language magnetic record and another correlated continuity of said translations being disposed in lagging relation to said known language magnetic record on the same tape, a magnetic head individual to each of said magnetic records, switching means individual to each of said magnetic heads, a reproducing circuit and individual circuits extending from said switching means to said reproducing circuit for interconnecting one or more of said magnetic heads with said reproducing circuit.

5. A magnetic recording and reproducing system comprising a tape for receiving a multiplicity of channels constituting magnetic records, a magnetic head individual to each of said channels for recording and reproducing magnetic records wtib respect to said channels, an independently operable switching device individual to each of said magnetic heads, a signal transmitting circuit, a signal reproducing circuit comprising a dual reproducing circuit having a pair of reproducers, circuit connections extending between said signal transmitting circuit and each of said switching devices and separate electrical circuits extending between each of said switching devices and said signal reproducing circuit and between each of said switching devices and said signal transmitting circuit, said switching devices being independently and selectively operative for connecting said signal transmitting circuit with the magnetic heads in certain of said channels and connecting other certain of said channels with said signal reproducing circuit for effecting simultaneous recording and reproduction upon or from selected channels whereby recordings may be effected on one of said channels in timed relation to recordings on another of said channels, and means for selectively connecting one of said reproducers with one of said magnetic heads and the other of said reproducers with another of said magnetic heads.

6. A magnetic recording and reproducing system as set forth in claim 5 in which there are at least four of said channels constituting magnetic records on said tape.

7. A magnetic recording and reproducing system as set forth in claim 5 which also includes means for selectively electrically connecting said reproducers in series or electrically in parallel.

8. A magnetic recording and reproducing system comprising a tape for receiving a multiplicity of channels constituting magnetic records, magnetic heads individual to each of said channels for recording and reproducing magnetic records with respect to said channels, a plurality of independently operable two-pole double-throw switches corresponding in number to the number of said heads, each of said switches having two sets of poles with center poles therebetween, said center poles being connected with the individual magnetic heads, a signal transmitting circuit, a signal reproducing circuit comprising a dual reproducing circuit connected with a pair of reproducers, circuit connections extending between said signal transmitting circuit and one set of poles of each of said switching devices and separate electrical circuits extending between the other set of poles of said switching devices and said signal reproducing circuit, said switching devices being independently selectively operative for connecting said signal transmitting circuit with the magnetic heads in certain of said channels and connecting other certain of said channels with said signal reproducing circuit for selectively effecting simultaneous, unilateral, or bilateral reproduction from one or more of said channels in said reproducers while effecting simultaneous recording in others of said channels from said signal transmission circuit.

References Cited in the file of this patent
UNITED STATES PATENTS 1,771,820     Rtcheouloff _____ July 29, 1930

FOREIGN PATENTS 377,276     Great Britain _____ July 22, 1932